Dec. 17, 1968     H. W. RENNER ET AL     3,416,407

LOADING APPARATUS FOR RECIPROCATING AND ROTATING A SHAFT

Filed Aug. 8, 1966     2 Sheets-Sheet 1

HOWARD W. RENNER
HERBERT R. UHTENWOLDT
                         INVENTORS.

BY

HOWARD W. RENNER
HERBERT R. UHTENWOLDT
INVENTORS.

United States Patent Office 3,416,407
Patented Dec. 17, 1968

3,416,407
LOADING APPARATUS FOR RECIPROCATING
AND ROTATING A SHAFT
Howard W. Renner and Herbert R. Uhtenwoldt, Worcester, Mass., assignors to The Heald Machine Company, Worcester, Mass., a corporation of Delaware
Filed Aug. 8, 1966, Ser. No. 571,114
4 Claims. (Cl. 91—36)

ABSTRACT OF THE DISCLOSURE

This invention has to do with a loading apparatus arranged to introduce workpieces into the operating area of a work machine tool and consisting of a shaft which is both slidably and rotatably carried in the machine tool housing, separate actuators are provided for rotating and sliding the shaft and means is provided to cause these actuators to operate in a cycle for the loading operation.

---

The art of loading workpieces into a machine tool has received a considerable amount of attention in recent years. This is because, generally speaking, the time in which loading takes place is a time when the machine is not productive; it is important, therefore, from the point of view of economics, to reduce this time to a minimum. One such mechanism which is particularly useful for loading the outer races of ball bearings into an internal grinding machine is shown in the patent application of Uhtenwoldt, Ser. No. 533,904, filed Mar. 14, 1966; in this construction, a loading plug is automatically moved longitudinally and rotatably about a longitudinal axis from a low position in alignment with the machine chuck to an upper position in alignment with the workpiece chute pickup point. The loading apparatus is operated automatically by use of a sequential valve which shifts fluid from one operating cylinder to another of the mechanism. Although this apparatus operates effectively, it is expensive, because of the many hydraulic lines that are necessary. With such a complex electro-hydraulic control, a certain amount of time is involved because of the long hydraulic lines which add hydraulic response time to the system. These and other difficulties experienced with the prior art devices have been obviated in a novel manner by the present invention.

It is, therefore, an outsanding object of the invention to provide a loading apparatus which is simple in construction and which is relatively inexpensive to manufacture.

Another object of the invention is the provision of a loading apparatus which operates quickly and also operates in a sequential system such that one part of the loading cycle cannot take place until the previous part of the cycle has been completed.

A further object of the present invention is the provision of a loading apparatus containing built-in safety interlock features.

It is another object of the instant invention to provide a loading apparatus which is, to a considerable extent, mechanical and which is free of long hydraulic response time.

With these and other objects in view, as will be apparent to those skilled in the art, the invention resides in the combination of parts set forth in the specification and covered by the claims appended hereto.

Figure 1:
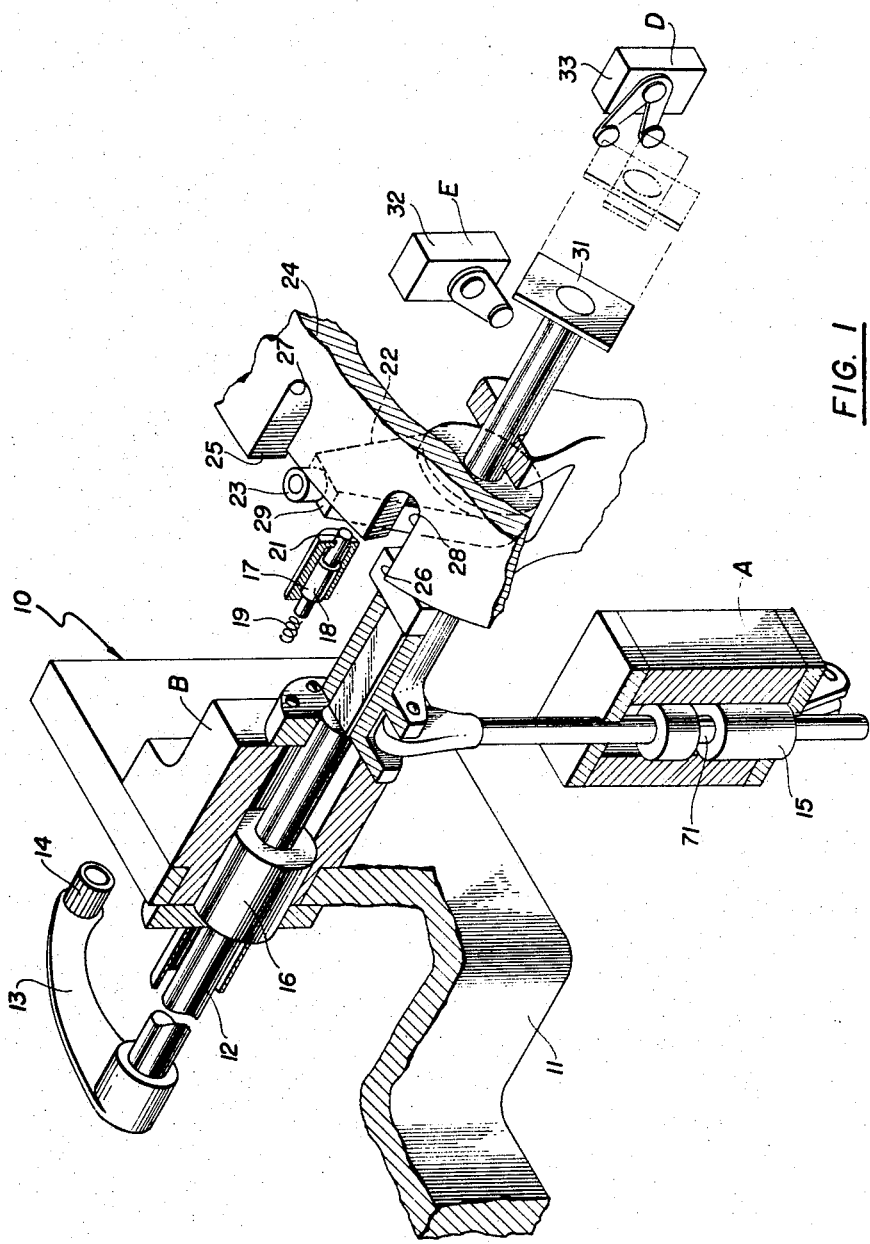
Figure 2:
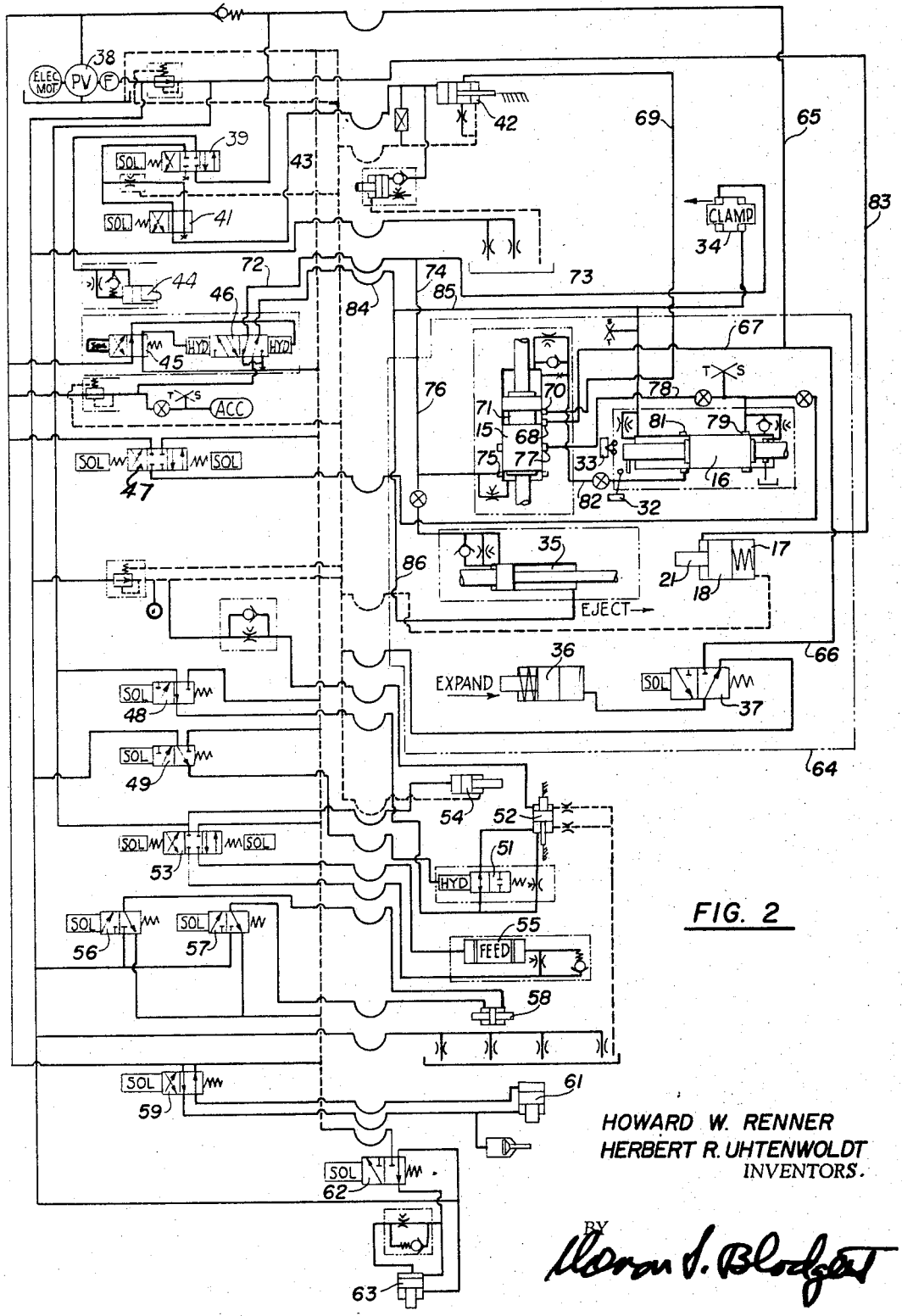

The character of the invention, however, may be best understood by reference to one of its structural forms, as illustrated by the accompanying drawings in which:

FIG. 1 is a perspective view of a loading apparatus embodying the principles of the present invention; and FIG. 2 is a hydraulic schematic diagram showing the relationship of the parts.

Referring first to FIG. 1, wherein are best shown the general features of the invention, the loading apparatus, indicated generally by the reference numeral 10, is shown as having a base 11 in which is slidably and rotatably carried a shaft 12. An arm 13 extends laterally from one end of the shaft and is provided with a workholding means, such as a loading plug 14, located at a substantial distance from the shaft and directed back toward the base 11. A first actuator, such as a hydraulic cylinder 15, is provided for rotating the shaft 12, while a second actuator, such as a hydraulic cylinder 16, is provided for sliding the shaft axially. Means is provided, as will be described more fully hereinafter, for causing the actuators to move the shaft and the workpiece-holding means in a cycle to successive positions relative to the base. Means is also provided for assuring that the workpiece-holding means has reached one of the said positions before it starts to move to the next successive position in the cycle.

A locking means 17 is provided to prevent rotative movement of the shaft when the apparatus is inoperative. This means is provided with a piston 18 which is biased by a spring 19 and carries a pin 21 into engagement with the side of an arm 22 which extends radially from the shaft 12. The piston 18 and the pin 21 are normally biased away from engagement with the arm 22 by hydraulic fluid. The top of the arm 22 is provided with a cam follower, such as a roller 23, which is supported on the outer end of the arm 22 for rotation about a radial axis. The roller 23 engages a cam plate 24 which is mounted in fixed relationship relative to the base 11. The roller 23 and the cam plate 24 cooperate to assure that the movement of the shaft 12 does not extend beyond a predetermined range.

The cam plate 24 is provided with guide surfaces which might be defined by an imaginary line which is radial to the axis of the shaft 12 and extends at a right angle thereto, this line moving axially and in planes perpendicular to the axis of the shaft 12 to form cam guide surfaces. The guide surfaces define shoulders 25 and 26 beside which extend axial slots 27 and 28. Between the slots extends a transverse guide surface 29 which is arranged inwardly of the transverse plane in which the shoulders 25 and 26 lie. A plate 31 is arranged at the tail end of the shaft 12 and positioned to engage a switch 32 whose condition is indicative of whether the shaft 12 is at one end of its axial movement or the other end. The plate also engages a switch 33 which indicates the position of rotation of the shaft 12 about its axis when the shaft is at the inner end of its axial movement.

FIG. 2 shows a hydraulic diagram of the elements of an internal grinding machine, such as that shown in the patent of Hohler et al. No. 3,197,921, which issued Aug. 3, 1965 and having the control means shown in the patent application of Lockwood et al. Ser. No. 449,817, filed Apr. 21, 1965.

The first actuator for rotating the shaft, namely, the hydraulic cylinder 15, the second actuator for sliding the shaft, namely, the hydraulic cylinder 16, the switch 32, and the switch 33 are shown as part of the hydraulic diagram. A clamping cylinder 34 is provided in connection with a chuck (not shown) to hold the workpiece, which chuck is in alignment with the loading plug 14 when the arm 13 is in its low position. The locking means 17 with its spring 19, its piston 18, and the pin 21 is also shown. The cylinder 35 is provided to eject workpieces from the chuck associated with the clamping cylinder 34. The loading plug 14 is provided with an actuating cylinder 36 which causes it to expand and contract within the bore of the workpiece for holding the same;

this cylinder is provided with a loading plug solenoid valve 37. The hydraulic circuit is provided with a pump 38 providing pressure oil in the usual way. The machine is provided with a table index valve 39 and a table speed selector valve 41 operating a table cylinder 42. A table "IN" dashpot 43 is provided, as well as a table "OUT" dashpot 44. A loading pilot valve 45 is associated with a loading valve 46 which serves to operate the clamping cylinder 34, the cylinder 15, the cylinder 16, the cylinder 35, and the cylinder 36. A part pickup valve 47 is provided. A feed-and-backoff valve 48 is provided, as well as a bypass damper valve 49, both associated with an end cap damper 51 and the cross slide feed cylinder 52. A feed-and-retract valve 53 receives pressure fluid along with a feed screw pre-load cylinder 54. A feed-and-retract cylinder 55 is associated with the valve 53. A feedback "larger" valve 56 and a feedback "smaller" valve 57 are associated with a feedback cylinder 58. A diamond turner valve 59 is associated with a diamond turner cylinder 61. A dresser valve 62 is associated with a dresser operating cylinder 63.

It should be noted that the hydraulic elements that are particularly associated with the loading apparatus 10 are outlined in the diagram by a broken line 64. A high pressure line 65 enters the apparatus and is connected, on the one hand, to the loading plug solenoid valve 37 by a line 66 and, on the other hand, by a line 67 to a port 68 associated with the cylinder 15. A line 69 from the table cylinder 42 leads to a lower port 70 also associated with the cylinder 15. The ports 68 and 69 are fairly close together and are hydraulically joined in the position of the cylinder shown in the figure by a groove 71 formed on the piston. A line 72 leading from the loading valve 46 is connected by a line 73 to the chuck clamp cylinder 34, on the one hand, and on the other hand, by a line 74 to an upper port 75 formed in the wall of the cylinder 15. Furthermore, the line 72 is connected by a line 76 to one end of the ejector cylinder 35. An intermediate port 77 on the cylinder 15 is connected by a line 78 to a port 79 at one end of the cylinder 16 and an intermediate port 81 on the cylinder 16 is connected by a line 82 to the bottom end of the cylinder 15.

A relatively low-pressure line 83 is connected to one side of the locking means 17, the other side of the cylinder 17 being connected to drain. A line 84 also leaves the loading valve 46 and is connected by a line 85 to the other end of the cylinder 34 and by a line 86 to the end of the ejector cylinder 35 opposite the end to which the line 76 is attached.

The operation of the apparatus will now be readily understood in view of the above description. Generally speaking, the loading plug 14 picks up a workpiece in the upper part of the apparatus and then moves it axially. Then, the arm 13 is swung downwardly to bring the plug 14 to a lower position in alignment with the chuck served by the chuck cylinder 34 at which time the plug 14 is moved axially inwardly to insert the workpiece in the chuck. The rotation of the shaft 12 necessary to move the arm 13 and the plug 14 from their upper position shown in FIG. 1 to the lower position in alignment with the chuck (not shown) is accomplished by the cylinder 15. The axial movement to move the arm 13 and the plug 14 axially from the inner, chute position to the outer position away from the chute (or the position within the chuck or the position removed from the chuck) is accomplished by the cylinder 16. The particular axial position and the particular position of rotation of the shaft and, therefore, of the plug 14 is determined by the switches 32 and 33 and they are used to operate the pilot valve 45, which, in turn, regulates the loading valve 46 to bring about the next step in any cycle. The movement of the roller 23 along the guide surfaces of the cam plate 24 serves to limit the movement and guarantee that the movement of the plug 14 from its upper to its lower position is not exceeded. This is because, in its upper position, the roller 23 contacts the shoulder 26 of the cam while, in its lower position, it contacts the shoulder 25, the distance between them being suitably selected. Furthermore, the movement of the plug 14 inwardly to the workpiece chute or to the chuck (depending upon whether it is in its upper or its lower position) is limited by the slots 27 and 28. The cam, therefore, limits motion in every mode of operation. The pin 21 is maintained in its inner position away from the arm 22 when there is plentiful oil at suitable pressure to hold it. At other times, when the machine is shut down or there is fluid leakage which might produce an accident in the machine, the pin protrudes outwardly and contacts the arm 22 to prevent the shaft from rotating. This causes the arm 13 and the loading plug 14 to remain in their raised position.

An observation of the hydraulic diagram in FIG. 2 shows that the cylinders 15 and 16 move to extreme positions within their bores in a sequence that carries out the four motions of the shaft and the arm 13 with the plug 14 to provide a loading cycle. The chuck clamping cylinder 34 and the plug expanding cylinder 36 operate at selected times in the cycle to assist in the loading and unloading operation. When the shaft 12 has been moved axially to its "IN" position and the arm 13 is in its "UP" position, the loading plug 14 lies in an unfinished workpiece in the loading chute (not shown). The cylinder 15 is inoperative at the bottom of its movement, but the cylinder 16 operates to move the shaft axially with the arm 13 remaining in its "UP" position. This is done by providing pressure oil through the line 84 and the line 85 to the rearward end of the cylinder 16. Pressure oil also passes to the clamping side of the chuck cylinder 34 to allow the chuck to hold the finished workpiece, while similar oil goes to the proper end of the cylinder 35 to retract the ejector rod. The cylinder 15 remains in its bottom position because there is no pressure oil to push it upwardly.

Once the loading plug has reached its "OUT" and "UP" position, the next motion swings the arm 13 downwardly. At that time, the cylinder 16 remains in a fixed position and pressure oil is introduced to the bottom of the cylinder 15 to push it upwardly. This oil comes through the line 74 after passing through the valve 46. The chuck cylinder 34 is now placed in such condition that the chuck is unclamped and the workpiece is ready to be ejected by the ejector rod under the action of the cylinder 35.

With the loading plug 14 in the "LOW" and "OUT" position, the next motion is to bring it inwardly toward the chuck so that the workpiece is inserted into the chuck. For this purpose, pressure oil is introduced to the end of the cylinder 16 and the piston moves inwardly. In a short while, oil leaving the top of the cylinder 15 is cut off as the port 81 is blocked by the piston. The cylinder 15 is blocked in the high position, so that the rim is locked in "LOW" position. When the cylinder 16 reaches its inward position, the contact with the switch 32 indicates that the chuck clamp pressure is to be reversed and oil is to be introduced into the cylinder 36 after passing through the loading plug valve 37 to cause the plug to release the workpiece.

Once the workpiece has been inserted in the chuck and the chuck has been clamped on it, the loading plug 14 is moved axially outwardly again by reversal of the valve 46 until the condition of cylinder 16 shown in FIG. 2 is reached again. At that time, oil is introduced into the top of the cylinder 15 to drive it downwardly and to rotate the arm 13 into "UP" position. When this point is reached, the so-called "PARK" position has also been reached at which position the loading plug 14 remains between cycles. If the machine is shut down at that time, the locking means 17 comes into operation so that the pin 21 contacts the arm 22 and prevents the shaft from rotating, so that the loading plug remains in "PARK" position, despite loss of oil during the shutdown period.

It can be seen, then, that this sequential operation removes the need for complex electrical-hydraulic controls. It, therefore, saves in the initial cost of the apparatus and makes it much easier to assemble in the shop. During operation of the machine, considerable time is saved in a grinding cycle by removing the need for a large number of switches, relays, solenoids, and valves, all of which would normally be located remotely from the cylinders, thus adding hydraulic response time. The interlock safety provides that table pressure can be obtained only when the arm 13 is in its upper position. This is because of the operation of the groove 71 and its relation to the ports 68 and 69 controlling the flow of fluid to the table cylinder 42. The operation of the apparatus is such that, if at any part of the cycle, something mechanical interferes with completing that part of the cycle, the apparatus cannot proceed to other parts of the cycle. For instance, if the workpiece won't fit in the chuck, the machine remains stalled at that position.

It is obvious that minor changes may be made in the form and construction of the invention without departing from the material spirit thereof. It is not, however, desired to confine the invention with the exact form herein shown and described, but it is desired to include all such as properly come within the scope claimed.

The invention having been thus described, what is claimed as new and desired to secure by Letters Patent is:

1. A loading apparatus, comprising
   (a) a base,
   (b) a shaft slidably and rotatably carried in the base,
   (c) an arm extending laterally from one end of the shaft and having a workpiece-holding means located a substantial distance from the shaft,
   (d) a first actuator for rotating the shaft,
   (e) a second actuator for sliding the shaft,
   (f) means causing the actuators to move the shaft and the workpiece-holding means in a cycle to successive positions relative to the base, and
   (g) stop means assuring that the workpiece-holding means has reached one of the said positions before it starts to move to the next successive position in the cycle, the stop means being provided for assuring that the rotative movement of the shaft does not extend beyond a predetermined range and consisting of a cam follower extending from the shaft and a cam plate associated with the base and having guide surfaces to be contacted by the cam follower, the cam plate being a curved plate arranged concentrically of the shaft, the cam follower comprising a roller arranged with its axis perpendicular to the shaft axis, and the guide surfaces comprising edges of the plate such as would be generated by a radial line moved first axially only a short distance, secondly radially and axially to generate the inner end of a slot, thirdly axially only a second distance less than the first distance, fourthly radially only through a substantial angle, fifthly axially only a distance equal to the second distance, sixthly axially and radially to generate the inner end of a slot, and seventhly axially only a distance equal to the first distance.

2. A loading apparatus as recited in claim 1, wherein locking means is provided to prevent rotative movement of the shaft when the apparatus is inoperative.

3. A loading apparatus as recited in claim 2, wherein the first actuator is a hydraulic cylinder and the locking means is a spring-loaded plunger which is normally biased to an inoperative position by the hydraulic pressure fluid used in the cylinder.

4. A loading apparatus as recited in claim 1, wherein the first actuator has a piston with a groove, wherein hydraulic lines for supplying fluid to a machine table cylinder enter the actuator at axially-spaced points, so that fluid can flow to the table cylinder only when the piston is positioned so that the groove bridges the said points.

References Cited

UNITED STATES PATENTS

| | | | |
|---|---|---|---|
| 477,621 | 6/1892 | Bulmer | 92—2 |
| 2,139,185 | 12/1938 | Engel | 91—44 |
| 2,347,875 | 5/1944 | Bratz | 91—61 |
| 2,616,323 | 11/1952 | Leifer | 92—2 |
| 2,886,008 | 5/1959 | Geyer | 92—24 |
| 3,028,620 | 4/1962 | Quinn | 92—185 |
| 3,174,406 | 3/1965 | Hague | 92—2 |
| 3,260,376 | 7/1966 | Stoll | 91—61 |

EDGAR W. GEOGHEGAN, *Primary Examiner.*

B. L. ADAMS, *Assistant Examiner.*

U.S. Cl. X.R.

91—44; 92—2, 24